United States Patent [19]

Yoshida et al.

[11] Patent Number: 4,509,776
[45] Date of Patent: Apr. 9, 1985

[54] CORROSION-RESISTANT PIPE COUPLING STRUCTURES

[75] Inventors: Toshio Yoshida; Kouyu Itoga, both of Kobe; Shigetomo Matsui, Higashiosaka; Toshio Atsuta, Akashi, all of Japan

[73] Assignee: Kawasaki Jukogyo Kabushiki Kaisha, Hyogo, Japan

[21] Appl. No.: 358,801

[22] Filed: Mar. 16, 1982

[51] Int. Cl.³ .............................................. F16L 15/00
[52] U.S. Cl. .................................... 285/55; 285/286; 285/382.4; 285/383
[58] Field of Search .................. 285/55, 383, 329, 286

[56] References Cited

U.S. PATENT DOCUMENTS

| 474,322 | 5/1892 | Harrington | 285/55 |
| 2,017,994 | 10/1935 | Spang | 285/383 X |
| 3,253,841 | 5/1966 | Ahmad | 285/55 |
| 3,266,821 | 8/1966 | Safford | 285/383 X |
| 3,442,537 | 5/1969 | Courtot et al. | 285/329 X |
| 3,620,555 | 11/1971 | Hinds et al. | 285/55 |
| 4,305,607 | 12/1981 | Westerlund et al. | 285/383 X |
| 4,400,019 | 8/1983 | Fruck | 285/383 |

FOREIGN PATENT DOCUMENTS

| 682597 | 3/1964 | Canada | 285/286 |
| 828783 | 1/1952 | Fed. Rep. of Germany | 285/55 |
| 1236876 | 3/1967 | Fed. Rep. of Germany | 285/55 |
| 1323194 | 2/1963 | France | 285/286 |
| 446334 | 1/1950 | Italy | 285/383 |
| 524175 | 9/1957 | Italy | 285/383 |

Primary Examiner—Thomas F. Callaghan
Attorney, Agent, or Firm—Wenderoth, Lind & Ponack

[57] ABSTRACT

A corrosion-resistant pipe coupling made of carbon steel has on its inner surface an intermediate annular projection directed radially inward. At least an innermost part of the annular projection is formed or corrosion-resistant material such as stainless steel. The annular projection is covered by a corrosion-resistant annular member or which is secured by friction welding, electron beam welding, an adhesive or mechanical engagement. The annular member prevents corrosion of the coupling by corrosive fluids flowing in pipes.

1 Claim, 22 Drawing Figures

CORROSION-RESISTANT PIPE COUPLING STRUCTURES

BACKGROUND OF THE INVENTION

This invention relates to pipe fitting structures, and more particularly to a pipe coupling structure used for piping in chemical and other plants, oil and gas pipelines, well tubes, and like piping.

In the piping and pipelines referred to above, multiple-wall composite pipes are used for transporting fluids such as those containing corrosive substances. A typical multiple-wall composite pipe is a dual or double-wall pipe in which the inner wall is a liner tube made of a corrosion-resistant material for effective conducting of corrosive fluid and the outer wall or pipe is designed to provide strength to withstand internal pressures of the corrosive fluid and external forces. For example, there is a double-wall pipe comprising a stainless-steel inner pipe and a carbon-steel outer pipe in which the inner pipe is interference-fitted.

There are certain limitations to the length of such multiple-wall pipes due to restrictions in the manufacture of the pipes and to conditions in which the pipes are installed in site. Therefore, pipe couplings are used to obtain a desired length of piping as is well known in the art. As a matter of course, the pipe couplings are also required to have an internal corrosion resistance as well as a mechanical strength to withstand internal pressures and external forces.

A typical pipe coupling structure known heretofore comprises a tubular coupling member having on axially opposite parts thereof internal or female threads engaging outer or male threads provided on the end parts of the two pipes to be coupled, the coupling member having an intermediate annular ridge or projection directed radially inward thereof to be abuttingly interposed between the opposing end surfaces of the two pipes. The radially inner surface of the annular projection is made to have the same diameter as the inner diameter of the two pipes to be coupled whereby a smooth, continuous or uninterrupted cylindrical inner surface is formed from one pipe to the other. This means that the annular projection of the coupling member is exposed to the corrosive fluid or fluids flowing in the pipes.

As a consequence it has been customary to make the coupling member of a corrosion-resistant material such as stainless steel. This gives the coupling sufficient resistance to corrosive fluids but is disadvantageous in that the coupling is very expensive and lacks sufficient strength, thereby resulting in increased thickness and weight and in interference with other elements and devices in and along the pipe line.

SUMMARY OF THE INVENTION

The main object of this invention is to provide a pipe coupling structure for use with a piping having a corrosion-resistant internal surface, wherein the strength of the coupling member is sufficient to withstand internal pressures and external forces, while the coupling member is resistant to corrosive fluids flowing in the pipes coupled by the member.

According to this invention, briefly summarized, there is provided a corrosion-resistant pipe coupling structure comprising a tubular coupling member having on axially opposite parts thereof internal screw threads engaging male screw threads provided on the axially opposing end parts of two pipes to be coupled, the internal surface of each of the pipes being resistant to corrosive fluids, and an intermediate annular projection provided on the inner surface of the coupling member and directed radially inward thereof to be abuttingly interposed between the opposing end parts of the pipes, the structure being characterized in that the intermediate annular projection is made of a material resistant to the corrosive fluids at least in a radially innermost part thereof.

The detailed nature, utility, and further features of this invention will be more clearly apparent from the following detailed description when read in conjunction with the accompanying drawings, briefly described below.

DETAILED DESCRIPTION OF THE INVENTION

Figure 22:
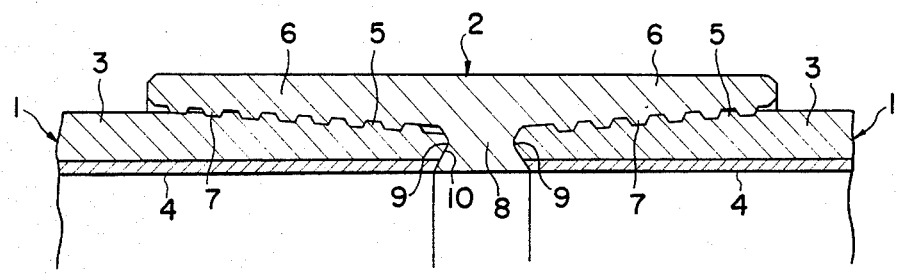
FIG. 22 is a fragmental longitudinal section showing a known pipe coupling structure.

Referring to FIG. 22 there is illustrated a known pipe coupling structure comprising two dual or double-wall composite pipes 1 to be coupled, and a screwed coupling member 2 having a substantially cylindrical body. Each of the double-wall composite pipes 1 comprises an outer wall or pipe 3 of carbon steel, for example, and an inner wall or pipe 4 of stainless steel, for example. The end portion of each pipe 1 is provided with outer or male threads 5.

The coupling member 2 has a pair of screw-threaded parts 6 with inner or female threads 7 which are in engagement with the male threads 5 of the pipes 1. The coupling member 2 has an intermediate annular ridge or projection 8 directed radially inward between the screw parts 6 so as to be abuttingly interposed between the opposing end surfaces of the pipes 1. The annular projection 8 has annular undercut portions 9 so that annular overhang portions diverging in radially inward directions are formed. The end surfaces of the pipes 1 are shaped complementarily to the undercut portions 9 of the projection 8, as shown at 10.

When the pipes 1 are screwed into the coupling member 2, the end surfaces 10 of the pipes are brought into tight, abutting, sealing contact with the undercut portions 9, respectively.

However, with such a construction, the annular projection 8 is exposed to corrosive fluid or fluids flowing in the pipes and subject to corrosion by the fluid or fluids, so that there arise the disadvantages mentioned hereinbefore.

Figure 1:
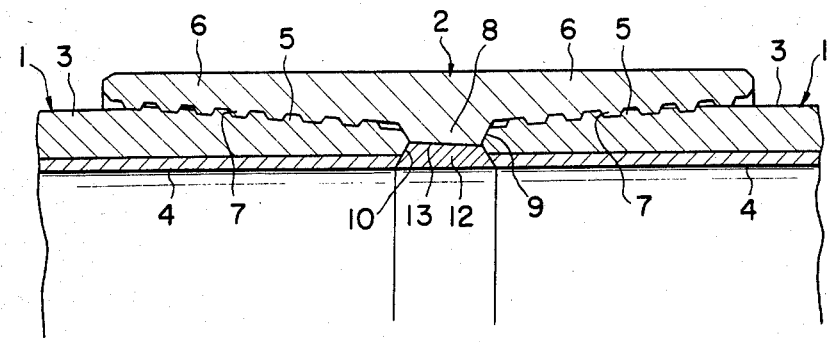
FIG. 1 is a fragmental longitudinal section of a pipe coupling structure according to a first embodiment of this invention.

FIG. 1 shows a first embodiment of the pipe coupling structure according to this invention. The coupling structure comprises dual or double-wall composite pipes 1 to be coupled, each made up of an outer pipe 3 and an inner liner pipe 4 interference-fitted in the outer pipe 3, and a coupling member 2 coupling the two pipes 1 by engagement of its female thread 7 with male threads 5 formed on the pipe end portions, as in the known pipe coupling structure shown in FIG. 22.

The coupling member 2 is provided with an annular intermediate projection 8 with annular undercut portions 9 at the two sides thereof, as is known in the art. According to this invention, the intermediate projection 8 terminates short of the inner cylindrical surfaces of the pipes 1, and, instead, an annular member 12 of a corrosion-resistance material, such as a stainless steel, is fixedly secured to the radially inner surface of the projection 8. As shown, the inner surface of the projection 8 is tapered at 13 and the outer surface of the annular member 12 is also tapered correspondingly. The inner surface of the annular member 12 is cylindrical and has the same diameter as the inner surfaces of the inner pipes 1, so that an uninterrupted cylindrical surface is formed within the pipes 1 and the annular member 12. Thus the annular member 12 constitutes a part of the intermediate projection 8.

It will be understood that the inner surface of the pipe coupling structure is lined or covered with the corrosion-resistant material throughout, whereby corrosive fluid, such as crude oil, flowing in the pipe coupling structure will not corrode the outer pipes 3 and coupling member main body 2 which are made of non-corrosion-resistant material, such as a high tensile carbon steel. Moreover, strength to withstand internal pressures and external forces is assured by the high tensile carbon steel forming the outer pipes and the coupling member.

The pipe coupling structure of the above construction may be produced by the following procedure.

Figure 2:
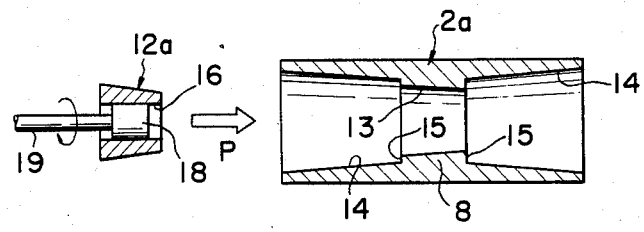
FIGS. 2 through 4 are longitudinal sections, illustrating sequentially how the structure shown in FIG. 1 can be produced.

First, as shown in FIG. 2, a cylindrical body 2a to be formed into the coupling member 2 and a small frustoconical body 12a to be formed into the annular member 12 are prepared separately. The cylindrical body 2a is prepared by machining a non-corrosion-resistant stock material so as to have a cylindrical outer surface, a pair of frustoconical recesses 14 coaxial with the outer surface, and a tapered bore 13 coaxially connecting the recesses 14 in mutual communication, with an annular shoulder 15 formed between the bore 13 and each recess 14. The frustoconical body 12a is prepared by machining a corrosion-resistant stock material so as to have a conical outer surface corresponding to the tapered bore 13 and an axial bore 16.

Figure 3:
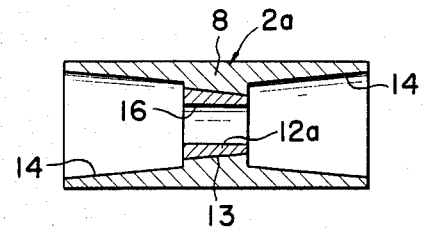

Thereafter, a chucking head 18 secured to a rotating spindle 19 is inserted into the bore 16 of the frustoconical body 12a and the head 18 is expanded for chucking. The spindle 19 is then rotated at a high speed, and the spindle and the body 12a are advanced into the interior of the cylindrical body 2a as indicated by arrow P. The body 12a is inserted finally into the tapered bore 13 and thrust forwardly into frictional sliding contact with the surface of the bore 13 by means of a thrusting mechanism, not shown. The surface of the tapered bore 13 and the outer conical surface of the body 12a are therefore subjected to friction welding due to frictional heat generated therebetween, and the frustoconical body 12a is fixedly secured to the cylindrical body 2a as indicated in FIG. 3.

Figure 4:
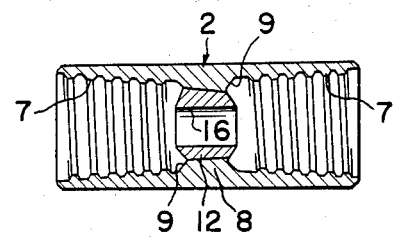

The assembly thus obtained is thereafter subjected to machining to form the female threads 7 and the annular undercut portions 9 as shown in FIG. 4. Thus, the pipe coupling member 2, which is to be applied to the pipes 1 as shown in FIG. 1, is produced.

Although the male and female threads 5 and 7 are illustrated as being tapered axially in the example shown, these threads need not be tapered but may be straight.

The above described method of producing the pipe coupling member is advantageous in that the welding surface area can be determined at will to obtain a desired strength of welding with high precision and in that, since the machining is carried out after the friction weld has been made, exact shaping of the undercut portions as well as clean trimming of the edges of the friction welded surfaces can be made to attain a high degree of tightness or excellent seal between the pipes and the coupling member.

In the pipe coupling structure described above, the corrosion resistant annular member 12 is secured to the coupling member 2 by friction welding, but the annular member can be secured to the coupling member by other securing means such as electron beam welding, laser beam welding and the like, or by adhesives.

Figure 5:
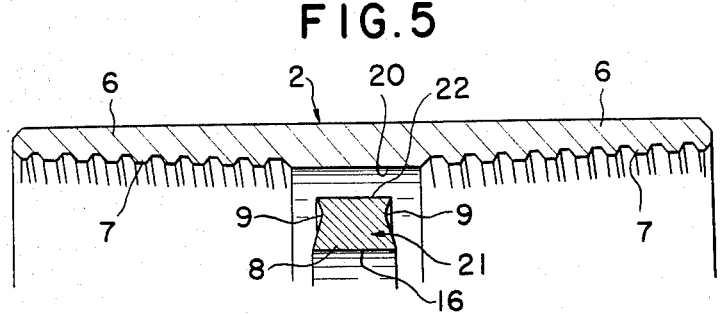
FIGS. 5 and 6 are longitudinal sections, explanatory of a method of producing a pipe coupling member used in a second embodiment of the invention.
Figure 6:
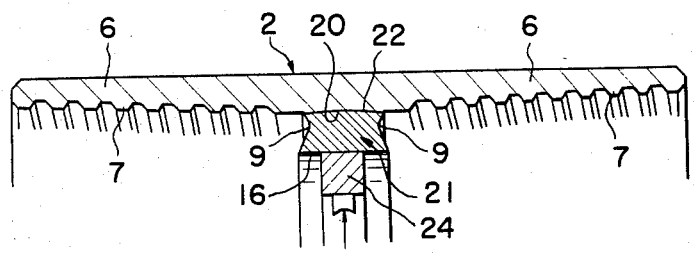

FIGS. 5 through 6 show a second embodiment of the invention. In these figures, parts and elements equivalent or corresponding to those shown in FIGS. 1 through 4 are designated by the same reference characters.

In this embodiment of the invention, the main body itself of the pipe coupling member 2 is not provided with an integral intermediate annular projection, but is formed with a cylindrical securing surface 20 which does not project radially inward beyond the female screw threads 7 of the coupling member 2, and to which a separately formed annular member 21 made of a corrosion-resistant material such as stainless steel is secured.

The annular member 21 has an outer cylindrical surface 22 and an inner cylindrical surface 16. The annular member 21 has also annular undercut portions 9 at opposite sides thereof so that an annular overhang portion 8 diverging in a radially inward direction is formed. The outer cylindrical surface 22 of the annular member 21 is of substantially the same diameter as the securing surface 20. Therefore, when the annular member 21 is placed in the space defined by the securing surface 20, the outer cylindrical surface 22 is in contact with the securing surface 20. After such a condition is obtained, a suitable expanding or chucking device 24 is fitted in the annular member 21 as shown in FIG. 6 to press the cylindrical surface 22 of the annular member 21 against the securing surface 20. Thereafter, beam welding, such as electron beam welding, is carried out along the interface between the surfaces 20 and 22 whereupon the annular member 21 is fixedly secured at the securing surface 20 to the main body of the pipe coupling member. The electron beam welding is carried out, for example, by projecting an electron beam from at least one side of the annular interface between the coupling member 2 and the annular member 21. For this purpose, an electron beam gun is moved along the edge of the annular interface relative to the coupling member and the annular member. The electron beam welding can be replaced by laser beam welding.

Figure 7:
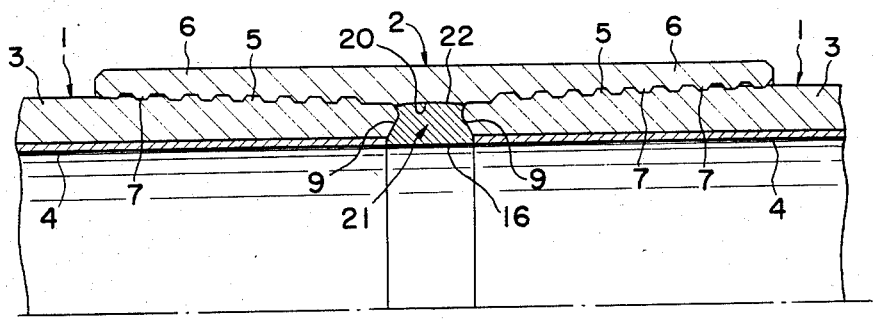
FIG. 7 is a fragmental longitudinal section of the second embodiment of the invention.

When the thus produced pipe coupling member 2 is applied to the pipes 1, a pipe coupling structure as shown in FIG. 7 is obtained. In this structure, the annular undercut portions 9 of the annular member 21 are fluid-tightly abutted against the complementarily shaped end surfaces of the pipes 1, and the inner cylindrical surface 16 of the annular member 21 smoothly connects the inner surfaces of the pipes as shown. It will be noted that the non-corrosion-resistant materials of the outer pipes 3 and the coupling member 2 are thus prevented from being corroded by corrosive fluid flowing in the pipe coupling structure.

Figure 8:
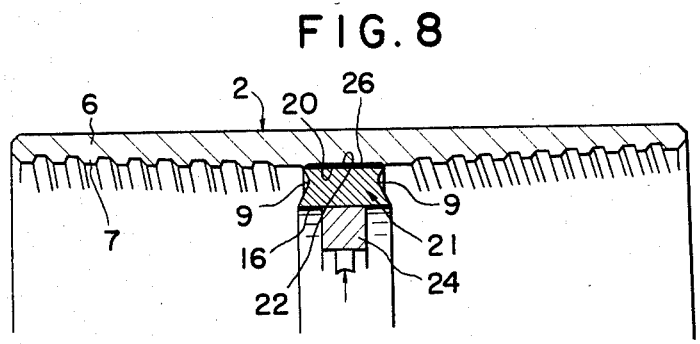
FIG. 8 is a view similar to FIG. 7 but showing a modification of the embodiment shown in FIG. 7.

The annular member 21 may be secured to the coupling member 2 by an adhesive as indicated at 26 in FIG. 8. Epoxy industrial adhesives are suitable for this purpose. When securing the annular member 21 to the coupling member 2, adhesive 26 is applied to at least one of the surfaces 20 and 22 and a suitable pressing or chucking device 24 is fitted in the annular member 21 to press the surface 22 firmly against the surface 20.

Figure 18:
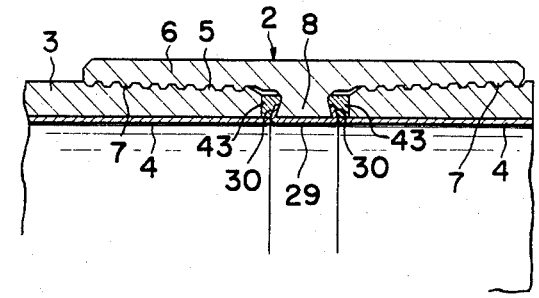
FIG. 18 is a fragmental longitudinal section of the third embodiment of the invention.

In a third embodiment of this invention illustrated in FIG. 18, an annular member 29 for protecting the pipe coupling member 2 from corrosive fluids is made from a corrosion-resistant sheet of metal, such as stainless steel. The coupling member 2 itself, shown in FIG. 14, has an annular projection 8 integral with the main body of the coupling, which projection 8 is directed radially inward. The annular projection 8 is formed with a pair of annular undercut portions 9 at its two sides. The annular member 29 has at its two edges respective flanges 30 which are bent radially outward so as to conform to the shape of the undercut portions 9. The annular member 29 is thus secured mechanically to the inner cylindrical surface of the projection 8. The bent flanges 30 engaging the undercut portions 9 prevent the annular member 29 from moving axially and radially inward relative to the projection 8.

Figure 12:
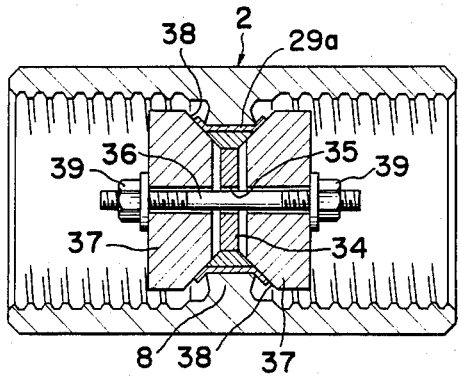
Figure 13:
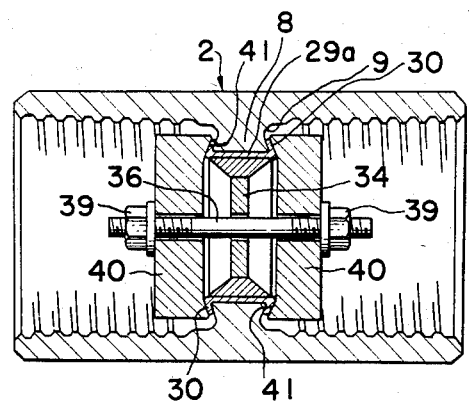
Figure 14:
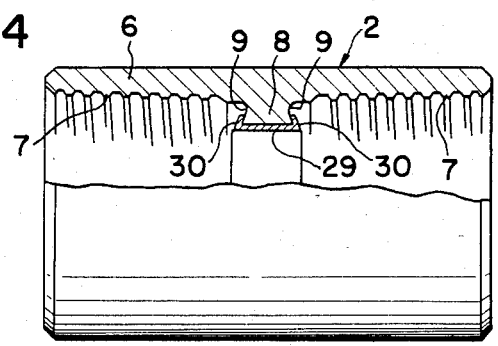
FIG. 14 is an elevation, partly in longitudinal section, of a coupling member used in a third embodiment of the invention.

The coupling member 2 shown in FIG. 14 may be produced by the steps shown sequentially in FIGS. 9 through 13.

Figure 9:
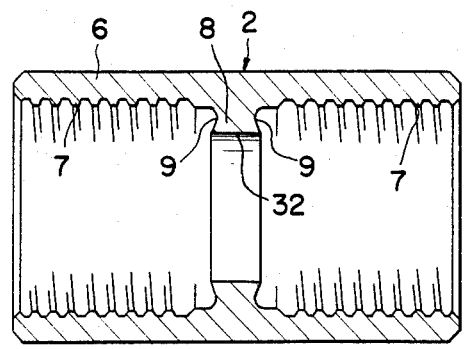
FIGS. 9 through 13 are longitudinal sections, illustrating sequentially the steps by which a coupling structure according to a third embodiment of the invention is produced.

First, a coupling body 2 shown in FIG. 9 is prepared by machining a stock material of a non-corrosion resistant material, such as a high tensile carbon steel. The coupling body 2 is formed with female threads 7, the annular projection 8 with a cylindrical surface 32, and the undercut portions 9.

Figure 10:
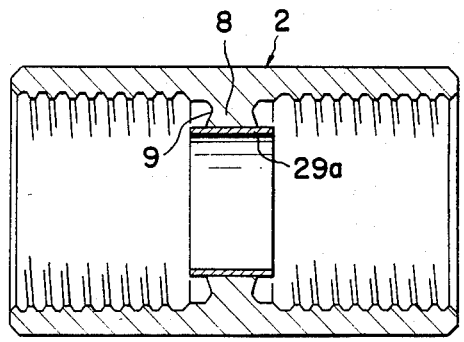

A cylindrical body 29a, shown in FIG. 10 and made of a corrosion-resistant material, is prepared separately. The outer diameter of the cylindrical body 29a is the same as the diameter of the cylindrical surface 32. The cylindrical body 29a is fitted tightly into the bore defined by the surface 32 as shown in FIG. 10.

Figure 11:
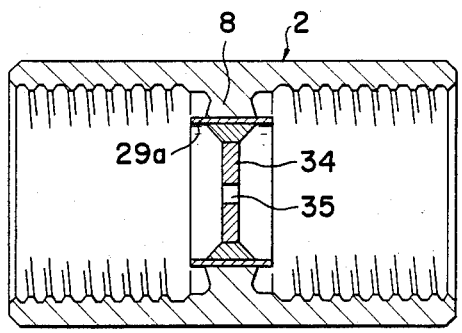

Thereafter, as shown in FIG. 11, a press jig 34, capable of being divided circumferentially for disassembly, is inserted into the cylindrical body 29a for pressing the latter firmly against the cylindrical surface 32 of the projection. The press jig 34 is formed with a central opening 35.

A tightening bolt 36 is then passed axially through the opening 35 as indicated in FIG. 12 and a pair of dies 37 each having a central axial hole are moved onto the bolt 36 from the two ends thereof with the bolt 36 passing through and projecting beyond the central holes of the dies 37. Each die 37 has a beveled or frustoconical annular surface 38 on its side opposing the other die. After the dies 37 are supported by the bolt 36, nuts 39 are screwed onto the two ends of the bolt and tightened. By the tightening of the nuts 39 the two dies 37 are forced toward each other, whereby the edge portions of the cylindrical body 29a are bent radially outward until they conform to the beveled surfaces 38, as shown in FIG. 12.

The dies 37 are thereafter removed after removal of the nuts 39, and another pair of dies 40 each formed with a countersunk annular surface 41 extending substantially parallel to the radially inner part of the undercut portion 9 are placed on the bolt 36 as shown in FIG. 13 and the nuts 39 are again tightened as shown, whereby the once bent edge portions of the cylindrical body 29a are further bent until they conform to the contours of the radially inner parts of the undercut portion 9. Thus, when the nuts 39, the bolt 36 and the press jig 34 are removed, the pipe coupling member 2 provided with the corrosion-resistant annular member 29 having the bent flanges 30 is obtained.

Figure 15:
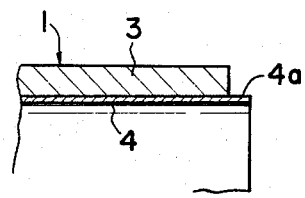
FIGS. 15 through 17 are fragmental sections showing sequentially how end parts of the pipes to be coupled are formed.
Figure 16:
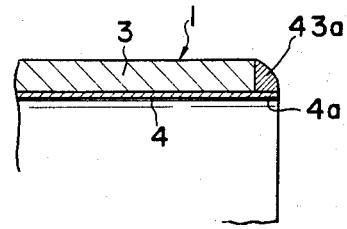
Figure 17:
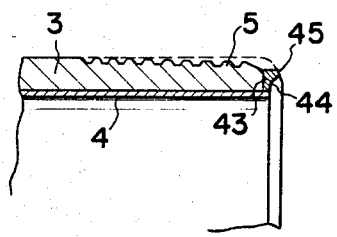

The pipes to be coupled by the coupling member 2 as described above may be formed as follows. Each pipe 1, comprising an outer pipe 3 and an inner corrosion-resistant pipe 4, is prepared to have the end 4a of the inner pipe projecting axially beyond the end of the outer pipe 3, as shown in FIG. 15, so as to form an annular shoulder, on which an annular padding 43a of stainless steel is overlaid thereafter as indicated in FIG. 16. The thus prepared pipe 1 is then machined to form male screw threads 5 on the outer surface of the outer pipe 3 and an annular undercut portion 44 at the pipe end as shown in FIG. 17. It will be noted that by undercutting the padding 43a at 44, an annular corrosion-resistant cover 43 with an annular overhang 45 is formed.

When two such opposing pipe end portions are coupled by the coupling member 2 shown in FIG. 14, the pipe coupling structure as shown in FIG. 18 is obtained, in which the annular projection 8 is interposed between the opposing annular covers 43 in sealing contact, the overhangs 45 of the covers 43 tightly engaging the respective undercut portions 9 of the annular projection. The inner cylindrical surface of the annular member 29 forms smoothly a continuation of the inner surfaces of the inner pipes or linings 4. It is to be noted that each bent flange 30 of the annular member 29 is in close contact with the surface of the respective undercut portion 44 and this also assures high tightness and that the bent flanges 30 serve to eliminate the possibility of the corrosive fluid reaching the non-corrosion resistant material of the projection 8.

Although the flanges 30 are bent in two steps as indicated in FIGS. 12 and 13, it is possible to carry out the bending of the flanges 30 in one step.

The advantage of the third embodiment of the invention is that, though the annular member 29 is thin, it can be secured to the annular projection 8 firmly and can protect the annular projection 8 fully against corrosive fluids.

Figure 19:
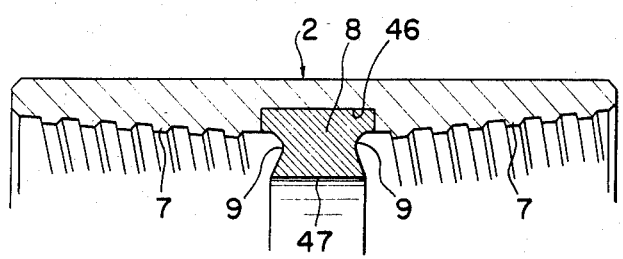
FIG. 19 is a fragmental longitudinal section of a coupling member of a fourth embodiment of the invention.
Figure 20:
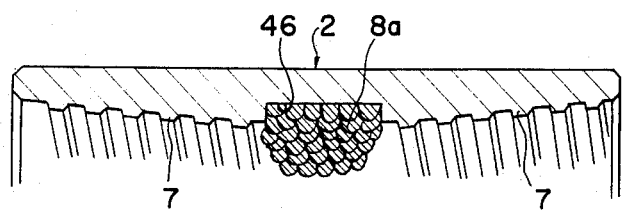
FIG. 20 is a view explanatory of a padding overlay to form an annular projection shown in FIG. 19.
Figure 21:
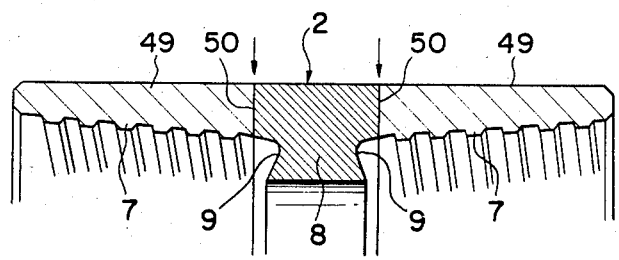
FIG. 21 is a fragmental longitudinal section of a coupling member of a fifth embodiment of the invention.

FIG. 19 illustrates a fourth embodiment of the invention wherein the annular projection 8 entirely made of corrosion-resistant material is along its outer periphery embedded in an annular groove 46. In order to form the projection 8, a cylindrical main body of the coupling member 2 is first formed with an annular groove 46 as illustrated in FIG. 20, and then an annular padding 8a of stainless steel, for example, is overlay-welded in the groove 46. Thereafter, the padding 8a is machined into the shape having an inner cylindrical surface 47 and a pair of undercut portions 9.

In the fifth embodiment of the invention, the annular projection 8 has its outer diameter equal to the outer diameter of the coupling member 2. The annular projection 8 is prepared separately is welded to cylindrical members 49 at 50 by electron beam welding, for example, as indicated by arrows.

Although the invention has been described in connection with a pipe made of an outer pipe and an inner liner pipe, it can equally be applied to pipes of single-wall structure entirely made of corrosion-resistant material.

We claim:

1. A corrosion-resistant pipe coupling structure comprising:
   a tubular coupling member including an inner surface and axially opposite ends having internal screw threads for engaging male screw threads provided on axially opposing end parts of two pipes to be coupled, the internal surfaces of each of the pipes being lined with material resistant to corrosive fluids;
   an unthreaded intermediate annular projection formed integrally with said inner surface of said coupling member and directed radially inward thereof to be abuttingly engaged by the opposing radial end surfaces of the pipes;
   an annular member made of a corrosion-resistant material which is initially separate from said annular projection and welded thereto to be engaged by the opposing radial end surfaces of the pipes lined with said material;
   the radially innermost surface of said annular projection forming a tapered bore; and
   said annular member having a conical outer surface shaped complementarily to said tapered bore, whereby said annular member can be friction-welded to said annular projection by inserting said annular member into said tapered bore and thrusting it axially of said bore while rotating said annular member into frictional sliding contact with said surface of said bore.

* * * * *